Figure 1:
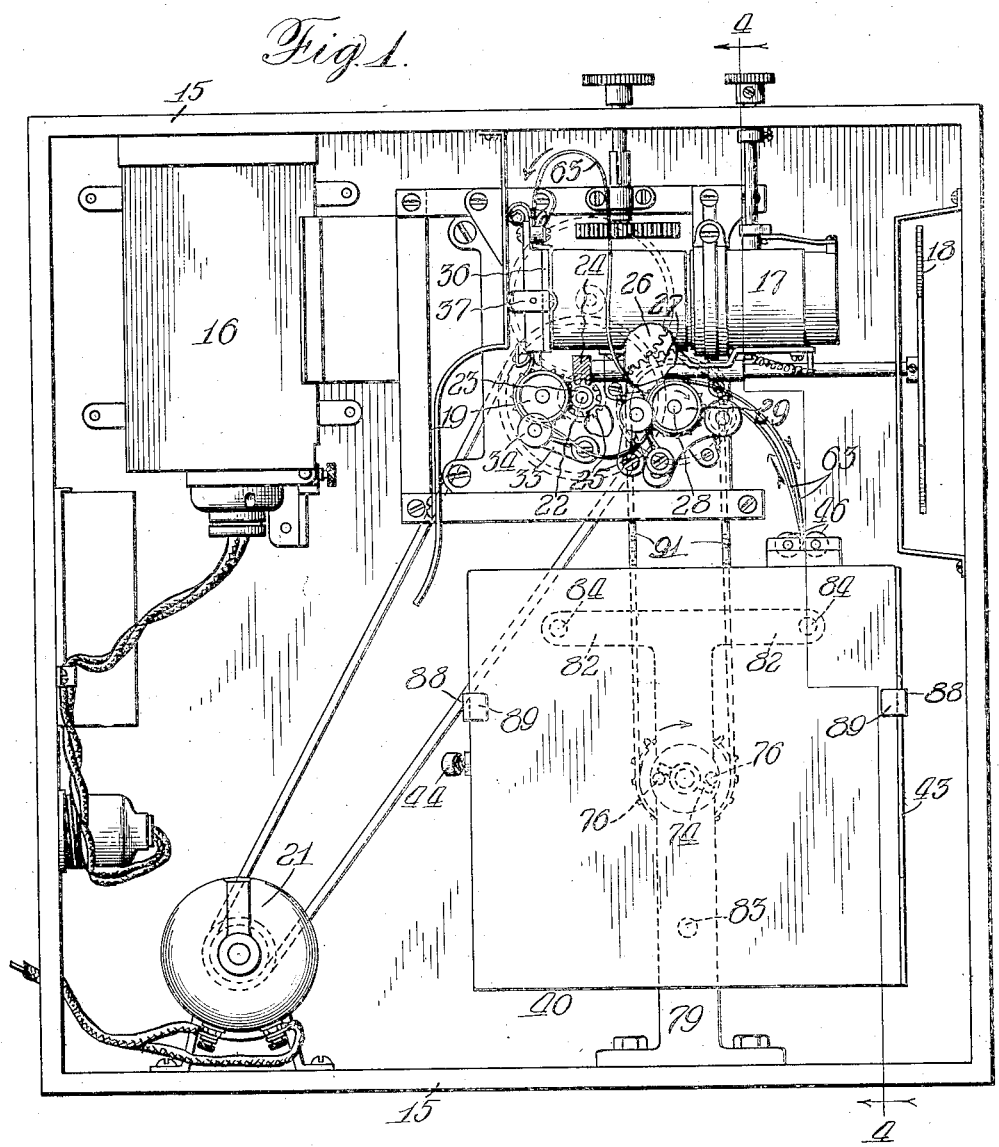

July 31, 1923.

L. B. LARSEN ET AL 1,463,620

FILM WINDING AND DELIVERY MEANS FOR MOTION PICTURE DEVICES

Filed March 14, 1921    4 Sheets-Sheet 1

Witness
Davl. S. Magnusson.

Inventors
Louis B. Larsen
Oscar J. Holmes
By Luther Johns  Atty.

July 31, 1923.

L. B. LARSEN ET AL 1,463,620

FILM WINDING AND DELIVERY MEANS FOR MOTION PICTURE DEVICES

Filed March 14, 1921  4 Sheets-Sheet 2

Witness
Dav E. S. Magnusson.

Inventors
Louis B. Larsen
Oscar J. Holmes
By Luther Johns, Atty.

July 31, 1923.   1,463,620
L. B. LARSEN ET AL
FILM WINDING AND DELIVERY MEANS FOR MOTION PICTURE DEVICES
Filed March 14, 1921    4 Sheets-Sheet 3

Witness:
Carl S. Magnusson.

Inventors
Louis B. Larsen
Oscar J. Holmes
By Luther Johns, Atty.

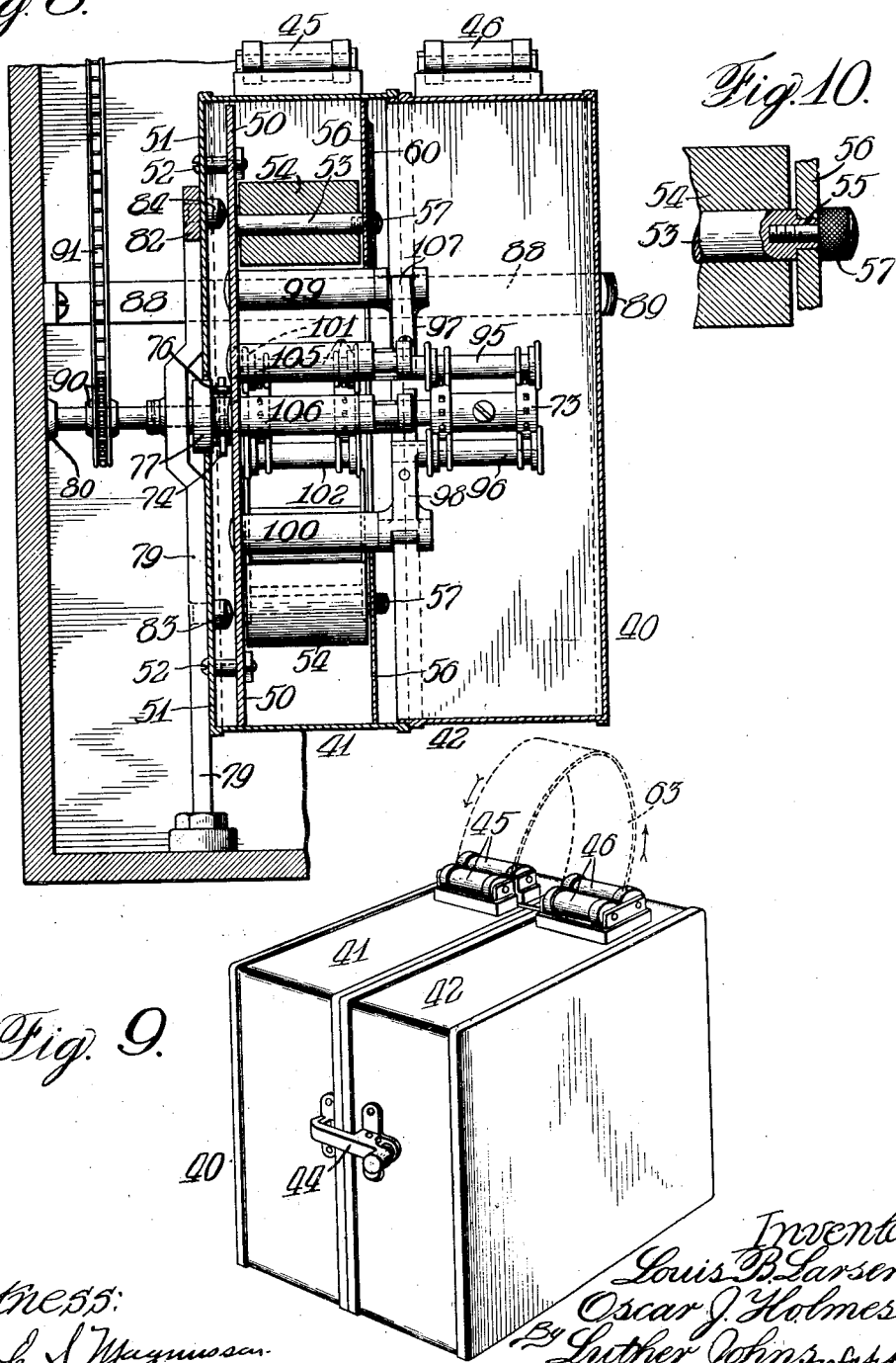

Patented July 31, 1923.

1,463,620

UNITED STATES PATENT OFFICE.

LOUIS B. LARSEN AND OSCAR J. HOLMES, OF CHICAGO, ILLINOIS.

FILM WINDING AND DELIVERY MEANS FOR MOTION-PICTURE DEVICES.

Application filed March 14, 1921. Serial No. 451,954.

*To all whom it may concern:*

Be it known that we, LOUIS B. LARSEN and OSCAR J. HOLMES, each a citizen of the United States and each a resident of Chicago, Cook County, Illinois, have jointly invented certain new and useful Improvements Relating to Film Winding and Delivery Means for Motion-Picture Devices, and of which the following is a specification.

The present improvements relate more particularly to winding and delivery means for a motion picture film having its originally free ends secured together and forming an endless band.

Various suggestions have heretofore been made of means for employing an endless film wound upon itself in a plurality of convolutions and for continuously withdrawing film from one convolution thereof to supply a loop of film passing through the projecting device. In some of these prior suggestions the film ring is in a horizontal position while in others it is vertically disposed. It has also been suggested to employ rotary means including a sprocket for drawing the film from one convolution of the ring, the pull upon that convolution operating to move the entire body of the ring and thus wind additional film upon the outer surface of the ring. It is also old to provide rollers circularly arranged to hold the laminated film in ring form. Various forms of casings have been suggested, too, for the film and film-moving parts.

So far as we are aware no suggestion hitherto made of a device for winding upon and unwinding from an endless film ring has proven a practical or commercial success. It has, however, heretofore been found feasible and practical to feed the film from the operating machine loosely into a compartment where it folds and doubles upon itself, the film being drawn out of the compartment at another locality thereof for passage through the machine. Aside from the large amount of compartment space required for a film of even relatively small extent there are many other highly objectionable features to that mode of operation.

One of the principal objects of the present improvements is to provide a simple, compact and unitary device which may constitute a permanent, never-to-be-changed housing, receptacle or magazine for the endless film, and which may be applied as a temporary attachment to the motion picture machine proper having provisions therefor, and which in use will continuously, effectively and satisfactorily deliver the film to the machine proper and receive it back into the magazine, the magazine having provisions whereby the film may be readily and conveniently installed therein and removed therefrom and in which magazine the film may be completely housed when it is not in use.

The advantages of such a construction include this that the maker or an owner of the film who rents it from time to time to others for use may install the film in the magazine and then deliver the magazine and film to the user who, by the simple application of the magazine bodily to his motion picture machine which has been adapted to receive it and by the simple operation of withdrawing a loop of film from the casing and positioning the same operatively in association with the film-moving devices of the machine, is ready to begin the projection of the picture. The projection may then continue indefinitely, without loss of time or annoyance to spectators such as is incident to the replacement of reels constituting different parts of the same picture and to the necessary rewinding operations after the ordinary double-ended strip-film has once been passed through the machine. Furthermore, after the period of use of the film has passed it is only necessary for the user to withdraw the magazine and film from the device, see that the film is completely housed therein, and return the magazine and contents to the owner or if he himself be the owner he may store the device away complete and intact ready for any future use. Another advantage of such construction is in the fact that where a plurality of different complete pictures are desired to be shown in succession or where different parts of the complete picture may be put up in different magazines, a single projecting machine having these improvements associated therewith will accomplish all of the desired results with a loss of but a minimum of time between pictures or separate parts thereof, for in the course of only a few seconds one magazine and film can be removed bodily from the projector and another substituted. With the ordinary double-ended strip-film such a saving of time has been measurably accomplished through the provision of a plurality of projectors, one being gotten ready for use during the operation of another.

An important object of these improvements is to provide simple and effective means for winding and unwinding the endless film from its laminated ring whether used in connection with a magazine, a readily detachable magazine, or otherwise. The improved film-winding-and-delivery means may be a permanent part of the machine, and the film ring, in such case, would be bodily inserted in and removed from the same as occasion required. Other objects and advantages will appear hereinafter.

In the accompanying drawings, which form a part of this specification, we have shown our improvements in a highly advantageous form and in association with a motion picture projector contained in a cabinet or case. For a description or illustration of the projector itself beyond what is herein given, reference may be had to U. S. Letters Patent to Larsen, et al, No. 1,283,224 of Oct. 29, 1918, No. 1,286,662 of Dec. 3, 1918, and No. 1,287,353 of Dec. 10, 1918.

Figure 2:
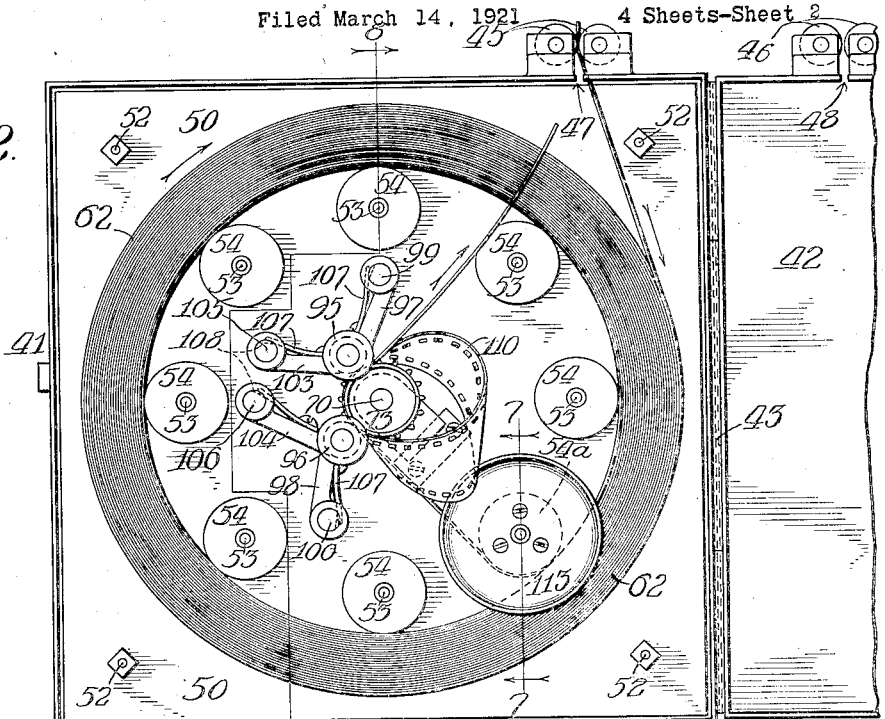
Figure 3:
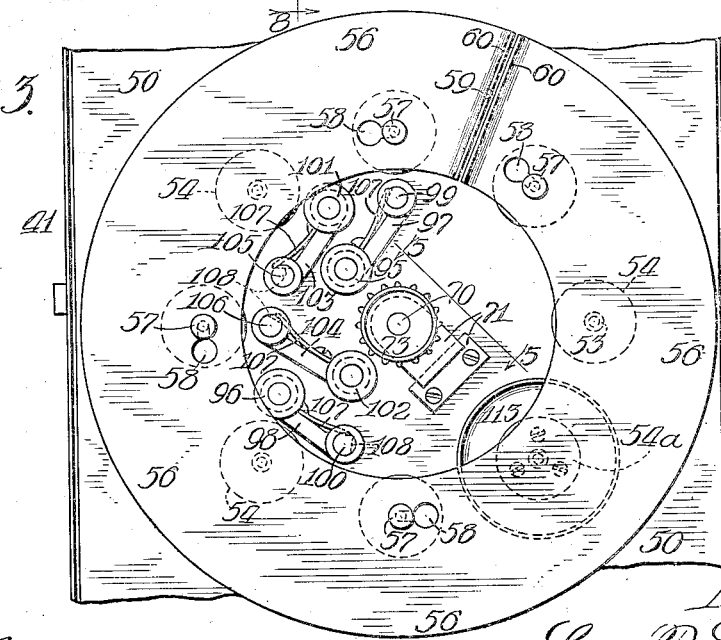
Figure 4:
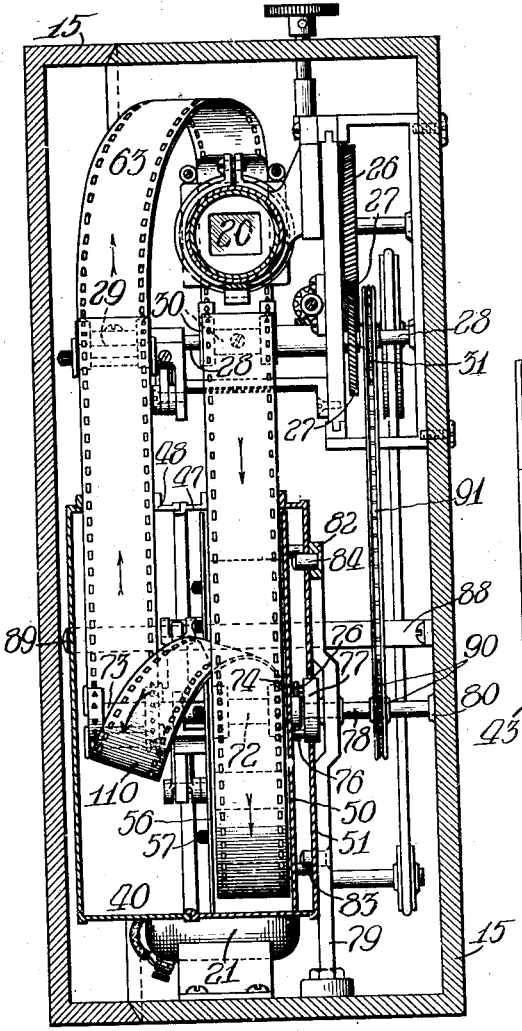
Figure 5:
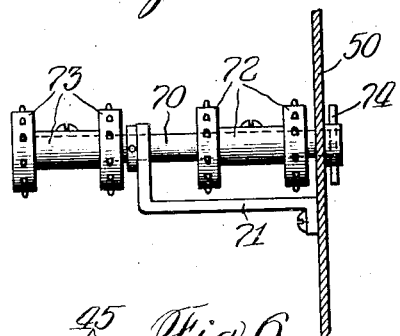
Figure 6:
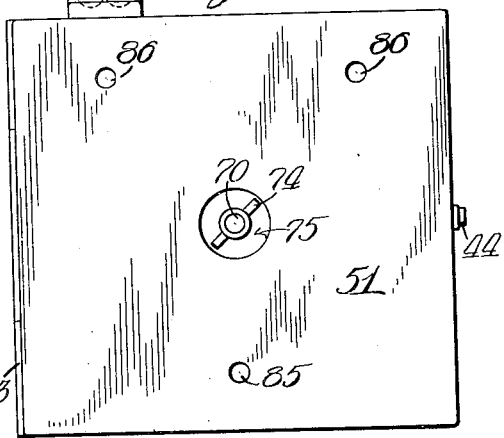
Figure 7:
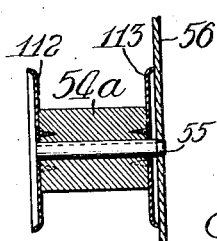

In these drawings Figure 1 is a face view of the projecting machine proper with our improved magazine device operatively positioned therein, the side door of the carrying case of the projector being removed and parts being broken away to show certain gear connections; Fig. 2 is a face view showing the main operative parts within the film magazine, the door thereof being shown fragmentarily and in open position; Fig. 3 is a fragmentary view of the magazine showing in other relative positions the film-holding devices which are associated with the feed and delivery sprockets, this figure also showing the application of a film-retaining plate which is omitted from Fig. 2; Fig. 4 is a transverse vertical sectional view substantially on the broken line 4—4 of Fig. 1; Fig. 5 is a fragmentary view in the direction of the arrows 5—5 of Fig. 3; Fig. 6 is a rear view of the film casing or magazine; Fig. 7 is a vertical sectional view on the line 7—7 of Fig. 2, showing the flanged roller from which the film passes to the film-pulling means; Fig. 8 is a sectional view substantially on the broken line 8—8 of Fig. 2, parts of the outer casing and of the supporting and operating means for the magazine device being also shown; Fig. 9 is a front, top and side perspective view of the magazine device with a small loop of film shown by dotted lines; and Fig. 10 is an enlarged sectional fragmentary detail of one of the roller-holding studs.

For present purposes a very brief description of the motion picture machine which we have selected for illustrative purposes will suffice. The present improvements are not limited to use in connection with projectors of the type, kind or class illustrated, but will find application to substantially all kinds and classes of strip-film motion picture projecting machines, but preferably such machines should have provision for the reception and removal of the film without a typical threading operation.

In the present drawings (see Fig. 1) the projecting machine parts as well as our improved film-receiving-and-delivering device are housed within the outer casing or cabinet 15, rectangular in shape. The projector proper includes a lamp housing 16 for an electric lamp, a projecting barrel 17, a shutter 18, an intermittent sprocket 19 for drawing the film step-by-step past the light opening 20, (Fig. 4) and various other operative parts readily to be understood from the drawings or from the patents mentioned.

A motor 21 drives the main power shaft 22 which carries part of a "Geneva movement" (not shown) for rotating intermittently the sprocket 19, also a pinion 23 engaging the worm gear 24 for driving the shutter, and also a pinion 25 meshing with the gear 26 which in turn is in mesh with the gear 27 (Figs. 1 and 4), the gear 27 being rigid upon the sprocket shaft 28 which is thus rotated continuously during the operation of the machine.

The shaft 28 carries a continuous feed sprocket 29 and a continuous take-up sprocket 30. These sprockets 29 and 30 constitute a feed-and-take-up device adapted to provide a constant loop of film, portions of which are intermittently being exposed. In the projector illustrated this feed-and-take-up device comprises two sprockets 29 and 30 on the same shaft, but this is not an essential requirement with respect to the improvements herein disclosed.

Each of the sprockets 19, 29 and 30 is provided with a spring-pressed swinging arm such as 33 (Fig. 1) having a roller 34 adapted to hold the film in contact with the sprocket. Such swinging arms as 33 and rollers as 34 are very common in the art in association with such sprockets, and it is important to point out here merely that when the arms as 33 and rollers as 34 associated with each of the sprockets 19, 29 and 30 respectively are moved out of the holding position thereof shown in Fig. 1, the film may be removed edgewise entirely away from the sprockets and from the machine, it being understood also that by opening a door 36 controlled by the latch 37 (Fig. 1) the film is released from the film-guiding means about the framing aperture 20 (Fig. 4).

Our improved film-containing magazine 40 (Fig. 9) is shown as being rectangular, but its exterior contour is not of particular importance and may be modified for particular adaptations or according to preference.

The one illustrated is to be understood as being formed of sheet metal and as comprising two hollow sections or parts 41 and 42, each part having normally vertical outer end walls and four side walls, a hinge 43 and a latch 44 providing means for holding the two sections firmly together yet for easy access to the interior of the magazine.

The magazine 40 carries two pairs of guide rollers 45 and 46, one pair on each magazine section, and the film passes between the rollers as illustrated during the operation of the machine. The magazine section top walls are correspondingly provided with slot-like recesses or openings 47 and 48, which openings come to the abutting edges of the two body parts or sections of the magazine (Fig. 4) whereby when the magazine sections 41 and 42 are moved apart different parts of the film may readily be positioned between the pairs of rollers 45 and 46.

Within one of the sections, as 41, of the magazine we provide an inner metallic wall 50 spaced from the outer end wall 51 of the magazine and rigidly maintained there by the bolts 52. Rigidly secured upon the plate or base 50 are cylindrical studs 53 (Figs. 2, 8 and 10) which are, in this specific construction, arranged in a circle and all of which extend in axial lines parallel to each other and at right angles to the base 50. Each stud 53 has rotatably mounted thereon a roller 54, these rollers being made, in my practice, of wood, and being adapted to turn freely on the studs 53 respectively. Each stud 53 has a reduced portion 55 at its outer end (Fig. 10) adapted to project into corresponding holes in the covering plate 56, and some of the studs (Fig. 3) are bored and internally threaded at their outer ends (Fig. 10) to receive the thumb screws 57 respectively, the function of which screws is to hold the plate 56 in readily removable relation upon the studs. The application and removal of the plate 56 is facilitated by the provision of a well-known bayonet-slot construction 58 where the screws 57 are shown.

The cover plate 56 is ring-like but is not continuous, there being provided in it a transverse slot 59, and the edges 60 of the metal there are turned outward so as to avoid any possibility of the film's catching against a rough edge there during the operation of the machine.

From this construction it is clear that by removing the plate 56 a ring of film, as 62 (Fig. 2) comprising a plurality of layers or convolutions, one upon another, may be placed upon the rollers 54 and that a loop of film, as 63 (Figs. 4 and 9), may have one portion thereof extending from the outer convolution of the ring between the guide rollers 45, that another free portion of the film may extend laterally from the inner convolution of the ring and, before the magazine sections are brought together, caused to pass between the guide rollers 46, and that owing to the slot 60 (Fig. 3) in the cover plate 56 this plate may again be positioned as in Fig. 3 with the last mentioned free portion of the film passing from one side of the cover plate 56 to the other thereof through the large middle opening in the plate.

The cover plate 56 and the relatively fixed plate or base 50 (Fig. 8) form an annular channel which is only a little wider than the film, and the film ring as 62 is thus maintained in a straight-wound condition on the rollers 54.

A highly important feature of these improvements is the provision of means within the casing for drawing the film positively from one convolution thereof, preferably the inner convolution as shown, in lines of force which are substantially parallel with the planes defined by the edge portions of the film ring, whereby the film is drawn in a straight-away direction from the body of the ring. The film is thus saved from the effect of forces tending to stretch it at one edge portion or the other or even to cause the film to break, the latter mischance frequently happening where the film is cracked or its edge is split or otherwise mutilated and the pull upon the film is not in a straight-away direction.

Another important feature is the provision of other positively-driven means for receiving the film from the pulling means just mentioned and delivering it for use of the projector, these latter means being spaced from the pulling means so as to provide an excess or substantially a loop of film between the pulling and delivery means, this excess being such that the necessary bending of the film to get it away from between the planes of the film ring will be on such easy lines and without any material pulling strains upon the film that the film is saved from injury during this part of its movement, the film delivery means having also the function of positively forcing the desired quantity of film forward toward the feed sprocket of the projector proper whereby an excess of film may constantly exist between the delivery sprocket and said feed sprocket.

According to this invention in its complete application there is only one place where any substantial pull upon the film is exerted namely at the film-pulling means associated with the film-ring-holding means, and the pull here is in direct lines, as hereinabove pointed out.

In carrying out the invention in this respect we provide, as a preferred embodiment, the construction illustrated and which in use has been found to provide all of the desired results and advantages hereinabove set forth. This mechanism comprises a rotatable shaft 70 (Fig. 5) mounted against longitudinal movement in the intermediate wall or base 50 and a bracket 71 secured to the base. The shaft 70 has mounted upon it the pulling-sprocket 72 which, as to be noted from Figs. 4 and 8, is positioned between the normally vertical planes defined by the opposite edge portions of the film ring, and since the shaft 70 extends at right angles to these planes the pull upon the film by the sprocket 72 is perfectly straight-away, that is, in lines parallel with the said planes.

A second sprocket 73, herein called the delivery sprocket, is also rigidly secured upon the shaft 70.

The sprocket shaft 70 is rotated by means of a pin 74 extending diametrically through that end portion of the shaft which is shown as extending beyond the inner wall 50 of the magazine. The outer magazine wall 51 (Fig. 6) is provided with an opening 75 concentric with the shaft 70 whereby access may be had to the driving pin 74 by a pair of studs 76 (Figs. 4 and 8) carried by a collar 77 on the shaft 78 coaxial with the shaft 70 and journaled in the relatively fixed upright supporting member 79 and in the casing of the machine at 80.

From Figs. 1, 4 and 8 it will be observed that the upright part 79 carries a stud 83 and that each of the lateral extensions 82 thereof carries a stud 84. From Fig. 6 it will be noted that one hole 85 and two holes 86 are provided in the end wall of the casing 40, which holes are spaced apart in the same relation as are the studs and are adapted to receive the studs 83 and 84 respectively. Two spring arms 88 having turned-over fingers or catches 89 are rigidly secured to the outer casing of the machine and extend forward alongside the magazine 40 with the fingers 89 engaging the normally front surface thereof at opposite edge portions and hold the magazine 40 firmly on the studs and in its desired operative position. For removing the magazine it is only necessary to spring apart the catches 88 and withdraw the magazine from the studs.

We provide means for rotating the pulling sprocket 72 and the delivery sprocket 73 at a rate which at any particular time of operation is common to that of the take-up sprocket 30 and the feed sprocket 29 of the projector proper, these means including, on the shaft 78, a sprocket 90 of the same operative size as the sprocket 31 on the shaft 28 (Fig. 4), a chain 91 passing over the sprockets 31 and 90.

In connection with the pulling sprocket 72 and the delivery sprocket 73 in the magazine we provide in each instance a pair of spring-pressed arms carrying rollers which are in all material respects like the arm 33 and roller 34 associated with the intermittent sprocket 19 and already described. In Fig. 2 these several pairs of arms and rollers are shown in the position they occupy when the device is normally in use. In Fig. 3 the arms and rollers are shown as being swung out of their holding engagement, one thereof but slightly. The rollers 95 and 96, (Figs. 2 and 8) are adapted to cooperate with the sprocket 73, and the respective arms 97 and 98 are pivoted respectively upon studs 99 and 100 secured upon the intermediate wall or base plate 50. The rollers 101 and 102 are arranged to coact with the pulling sprocket 72, and their respective arms 103 and 104 are pivotally mounted upon studs 105 and 106 also rigidly secured upon the base 50. On each arm there is a leaf spring 107 (Fig. 3), which, coming into flat engagement with the flat surface 108 on each of the studs 99, 100, 105 and 106, holds the associated roller in operative contact with the film, as shown in Fig. 2. When any lever is moved out of operative position with its spring 107 away from the flat surface 108 it remains out of the sprocket-contacting position. When the rollers are thus held out the film may readily be applied to or removed from the sprockets.

Since each pair of rollers 95—96 and 101—102 has its members spaced from each other partially around the periphery of the sprockets which they respectively engage their effect is to cause the film to travel straight while upon the sprockets respectively, so that at the places where the film is being operated upon the pull upon it is straight, leaving it free to bend only at places in its path of travel where there is no pulling strain upon it.

The delivery sprocket 73 being spaced from the pulling sprocket 72 provision is thereby made for a substantial excess or loop of film 110 (Figs. 2 and 4) constantly maintained between these sprockets in the normal operation of the machine, this excess film being somewhat in the form of a spiral. The film at this place always proceeds forward and around while moving laterally and it is thus enabled to adjust itself in the most easy manner to the slight bending or twisting action involved. From the delivery sprocket 73 the film passes directly to the rollers 46 and thence to the feed sprocket 29.

As already noted, the film is drawn by the pulling sprocket 72 from the inner convolution of the film ring 62. In order further to insure its straight-away movement toward the pulling sprocket we provide the roller 54ª, which is in other respects like the rollers 54, with an inner flange 112 (Fig. 7) and an outer flange 113 secured to the roller as by screws. The film passes from the roller 54ª directly to the pulling sprockets 72.

When the machine is in operation the whole body of the film ring 62 is moved, and in the clockwise direction as viewed in Fig. 2, the supply for purposes of projection passing out of the casing or magazine between the rollers 46, and that part of the loop which has been exposed coming back into the magazine between the rollers 45 and being wound upon the periphery of the ring, forming its outer lamination. This action is continuous so long as the machine is in operation.

While we have thus illustrated and described a highly efficient embodiment of these improvements, the invention is not limited to the specific construction and arrangement of parts shown, and reference should be had to the appended claims to determine the scope of the improvements herein set forth.

We claim:

1. A combined film-holder and casing for an endless film comprising walls forming a casing having an inlet and an outlet for the film, means within the casing for operatively holding between normally substantially vertical planes touching the opposite edge portions of the ring a film ring comprising a plurality of convolutions of the film, rotary film-pulling means for drawing the film from one convolution of said ring, and rotary film-delivering means for receiving and delivering the film from said film-pulling means, the film-pulling means being operatively positioned substantially between the vertical planes substantially defined by the opposite edges of the film ring and having an axis of rotation at substantially a right angle to said planes, the film-delivering means being spaced from the film-pulling means.

2. A combined film-holder and casing for an endless film comprising walls forming a casing having an inlet and an outlet for the film, means within the casing for holding between normally substantially vertical planes touching the opposite edge portions of the ring a film ring comprising a plurality of convolutions of the film, rotary film-pulling means for drawing the film from the inner convolution of said ring, and rotary film-delivering means for receiving and delivering the film from said film-pulling means, the film-pulling and the film-delivering means having a common axis of rotation which is substantially at a right angle to said planes, the film-pulling means being substantially between said planes, the film-delivering means being spaced from the film-pulling means.

3. A combined film-holder and casing for an endless film comprising walls forming a casing having an inlet and an outlet for the film, a plurality of rollers in ring form within the casing for holding a film ring comprising a plurality of convolutions of the film, rotary film-pulling means carried by the casing for drawing the film from one convolution of said ring, and rotary film-delivering means carried by the casing for receiving and delivering the film from said film-pulling means, the film-pulling means and the film-delivering means having a common axis of rotation, the pulling means being substantially between planes substantially defined by the opposite edges of the film ring, the film-delivering means being spaced from the film-pulling means to provide for a loop of film between them.

4. In a motion picture machine for operating upon a tape-like film, the combination of a feed-and-take-up device adapted to move different parts of a film at the same rate of travel, means for holding in ring form an endless film wound upon itself in a plurality of convolutions with a loop thereof extending beyond the ring and passing over said feed-and-take-up device, film-pulling means for drawing film from one convolution of said ring, film-delivering means spaced from the film-pulling means, means for operating the feed-and-take-up device to move the film at a given rate of travel, and means for operating the film-pulling means and the film-delivery means respectively to move the film at the pulling means and at the delivery means at the same rate as that provided by said feed-and-take-up device at all times during the normal operation of the machine.

5. In a motion picture machine for operating upon a tape-like film, the combination of a rotary feed sprocket, a rotary take-up sprocket, means for operating said sprockets at a common rate of rotation, means for holding in ring form an endless film wound upon itself in a plurality of convolutions with a loop thereof extending beyond the ring and passing over each of said sprockets, a film-pulling sprocket associated with said film-holding means for drawing film from one convolution of said ring, said film-pulling sprocket being positioned substantially between the planes defined by the opposite edge portions of the film ring, a film-delivery sprocket spaced from said film-pulling sprocket, and means for rotating the film-pulling sprocket and the film delivery sprocket at a rate common with that of the feed-and-take-up sprockets.

6. In a motion picture machine for operating upon a tape-like film, the combination of a feed-and-take-up device, means for operating said device whereby the feed-and-take-up will move the film at a common rate, means for holding in ring form an endless film wound upon itself in a plurality of convolutions with a loop thereof extending beyond the ring and into operative engagement with the feed-and-take-up device, a film-pulling sprocket associated with said film-holding means for drawing film from the inner convolution of said ring, said film-pulling sprocket being positioned between opposite portions of the film-holding means and substantially between planes defined by the opposite edge portions of the film ring, a film delivery sprocket spaced from said film-pulling sprocket and on the same axis thereof, means for holding the film on each of said sprockets, and means for rotating said sprockets to move the film at a rate common with that of the feed-and-take-up device.

7. In a motion picture machine for operating upon a tape-like film, the combination of a feed sprocket, a take-up sprocket, means for operating said sprockets at a common rate of rotation, means for holding in ring form an endless film wound upon itself in a plurality of convolutions with a loop thereof extending beyond the ring and passing over each of said sprockets, a film-pulling sprocket rotatably mounted in the inner space defined by said film-holding means for drawing film from the inner convolution of said ring, said film-pulling sprocket being positioned substantially between the planes defined by the opposite edge portions of the film ring and having an axis of rotation substantially at a right angle to said planes, a film-delivery sprocket rotatably mounted on the same axis as is the film-pulling sprocket, means associated with each sprocket for maintaining the film operatively thereon, and means for rotating the film-pulling sprocket and the film-delivery sprocket at a rate common to that of the feed and take-up sprockets.

8. In a motion picture machine for operating upon a tape-like film, the combination of a feed sprocket, a take-up sprocket, means for operating said sprockets at a common rate of rotation, a casing, means for holding the casing in readily removable relation to a relatively fixed part of the machine, said casing having an inlet and an outlet for the film, means within the casing for holding in ring form an endless film wound upon itself in a plurality of convolutions with a loop thereof extending through said inlet and said outlet and passing over each of said sprockets when the device is normally in use, a rotary film-pulling sprocket carried by the casing and positioned substantially between planes defined by the opposite edge portions of the film ring, said pulling sprocket being adapted to draw film from one convolution of said ring, a film-delivery sprocket also carried by the casing and in spaced relation to said film-pulling sprocket, means associated with the pulling and delivery sprockets respectively for maintaining the film operatively thereon, and means for rotating the film-pulling sprocket and the film-delivery sprocket.

9. The combination of a substantially closed casing having a door for the insertion and removal therethrough of a ring of film, means within and carried by the casing for holding a film ring comprising a plurality of layers of the film one upon another, the casing having an inlet and an outlet for a loop of film extending from within to without the casing, a shaft carried by the casing and extending therein substantially at right angles to the planes defined by the opposite edges of the film when normally carried by said film-holding means, a sprocket coaxially mounted on said shaft and positioned substantially between said planes, a second sprocket on said shaft, and means for rotating both of said sprockets at a common rate.

10. A film receiving and delivery device comprising a shaft having a pair of film-engaging sprockets thereon, film-holding means adapted to hold a plurality of convolutions of film in ring form, said holding means encompassing said shaft, the shaft being substantially at right angles to the planes defined by opposite edge portions of the film, and means for rotating said sprockets.

11. A film receiving and delivery device comprising a shaft having a pair of film-engaging sprockets thereon, means associated with each sprocket for holding the film operatively thereon, film-holding means including a plurality of rollers in ring form for holding a plurality of convolutions of film in ring form, the ring of rollers encompassing said shaft, the shaft being substantially at right angles to the planes defined by opposite edge portions of the film, and means for rotating said sprockets.

LOUIS B. LARSEN.
OSCAR J. HOLMES.